(12) United States Patent
Huberman et al.

(10) Patent No.: US 7,711,657 B1
(45) Date of Patent: May 4, 2010

(54) RESOURCE-RESERVATION PRICING STRUCTURES BASED ON EXPECTED ABILITY TO DELIVER

(75) Inventors: Bernardo Huberman, Palo Alto, CA (US); Li Zhang, Sunnyvale, CA (US); Fang Wu, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 844 days.

(21) Appl. No.: 11/476,305

(22) Filed: Jun. 26, 2006

(51) Int. Cl.
*G06F 17/00* (2006.01)
*G06G 7/00* (2006.01)
*G06Q 30/00* (2006.01)
*G06Q 10/00* (2006.01)

(52) U.S. Cl. ............................ 705/400; 705/1.1; 705/5; 705/6

(58) Field of Classification Search .................... 705/1, 705/5, 6, 400
See application file for complete search history.

(56) References Cited

U.S. PATENT DOCUMENTS 5,797,127 A * 8/1998 Walker et al. .................. 705/5

6,871,181 B2 * 3/2005 Kansal ........................... 705/4
2006/0085544 A1 * 4/2006 Chen et al. .................. 709/226

OTHER PUBLICATIONS

Southwest Airlines and Sabre Airline Solutions Sign a Seven-Year Passenger Reservations Contract, May 3, 2005, Business Wire.*
Clearwater, et al., "Swing Options: a Mechanism for Pricing IT Peak Demand."
Conlisk, et al., "Cyclic Pricing by a Durable Goods Monopolist," The Quarterly Journal of Economics, Aug. 1984, vol. 99, No. 3, pp. 489-505.
Huberman, et al., "Social Dilemmas and Internet Congestion," Science, Jul. 25, 1997, vol. 277, pp. 535-537.
Sobel, J., "Durable Goods Monopoly with Entry of New Consumers," Econometrica, Sep. 1991, vol. 59, No. 5, pp. 1455-1485.

* cited by examiner

*Primary Examiner*—John W Hayes
*Assistant Examiner*—Michael Harrington

(57) ABSTRACT

Provided are systems, methods and techniques for establishing a pricing structure for reserving a resource. An option is selected from among a plurality of available options with respect to delivery of a resource at a specified future time, and then the selected option is presented to a customer. Each of the plurality of options includes: (i) a reservation price at which the customer may reserve the resource, and (ii) a compensation amount that must be paid if the resource is not delivered at the specified future time. The specified future time may be either a point in time or an interval of time.

16 Claims, 5 Drawing Sheets

RESOURCE-RESERVATION PRICING STRUCTURES BASED ON EXPECTED ABILITY TO DELIVER

FIELD OF THE INVENTION

The present invention pertains to pricing structures that can be used in connection with a reservation of a resource, e.g., a time-dependent resource, and is particularly applicable to situations where there is some amount of uncertainty as to whether or not the resource will in fact be provided.

BACKGROUND

An important enabler of interactions over the Internet is the notion of trust, for it allows access to services, information, and customers without having to resort to validating procedures that can increase the complexity of an exchange so as to make it impractical. That is one reason why reputations play an important role in deciding the level of trust in commercial exchanges, in setting the value of particular brands, and in deciding whom to consult for professional advice.

A problem with reputations is that the time scales for their buildup or decay can be very long compared to the typical times involved in exchanges between a provider and a customer. This is not a problem if enough transactions have taken place so that a reputation or brand name can be established and made known to all parties concerned. However, this is not always the case. Accordingly, in place of such a reputation or brand name, a number of trust management mechanisms for online environments have been proposed, ranging from the familiar reputation feedback methods used by eBay™, to the creation of trust records and model-based compliance tools.

For all of these proposed solutions, however, either history or repeated interactions with a customer or system typically are necessary in order to establish a level of trust. Unfortunately, in many cases, especially those involving one-time exchanges or new providers of services, the repeated interactions necessary to establish a reputation are not feasible. Indeed, there are many situations in online environments where no reputation is available, while a need remains for an assurance that a particular quality of service (QoS) will be provided within a single exchange. One example is where a customer might require access to a utility data center that promises a given QoS level, but the customer cannot determine for certain whether or not that level of service in fact will be provided.

SUMMARY OF THE INVENTION

Moreover, the present inventors have discovered that even when a reputation or brand name is involved, it is not always optimal to make available 100% of the resources that have been reserved in advance. For example, certain customers will reserve a resource even if they are not 100% certain that they will need it, or even be able to use it, when the time comes. Other customers will reserve a resource intending to use it, but under circumstances where any failure to actually receive the resource when the time comes might cause some inconvenience but will not result in dire consequences.

The present invention addresses of these problems, in certain representative embodiments, by providing systems, methods and techniques for establishing a pricing structure for reserving a resource. An option is selected from among a plurality of available options with respect to delivery of a resource at a specified future time, and then the selected option is presented to a customer. Each of the plurality of options includes: (i) a reservation price at which the customer may reserve the resource, and (ii) a compensation amount that must be paid if the resource is not delivered at the specified future time. The specified future time may be either a point in time or an interval of time.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

Among other things, the present invention provides systems, methods, techniques and mechanisms for creating pricing structures that can be used in connection with a reservation of a resource. As used herein, a resource is intended to mean any type of good or service. Certain of such pricing structures are particularly applicable to situations where there is some uncertainty as to whether the resource provider will be able to deliver the resource. In addition, the present invention also has applicability to reservations of time-dependent resources.

As used herein, a time-dependent resource is a resource that must be used or consumed within a limited period of time or else it is wasted. Ordinarily, the supply of a time-dependent resource is very difficult to alter, or becomes very difficult to alter as the time for providing the resource nears.

A common example of a time-dependent resource is an airline seat. Basically, each seat on any given flight must be sold or else it will be a wasted resource, from the airline's perspective. If given enough advance notice, the airline might be able to rearrange its flight schedule or add flights here or there. However, at some point, for efficiency reasons all or nearly all of the airline's planes become committed, making further changes very difficult. At that point, some limited accommodations might still be possible, e.g., in cases where an airplane is grounded for mechanical reasons, but large-scale scheduling changes to accommodate last-minute changes in demand simply are not made in practice.

Figure 1A:
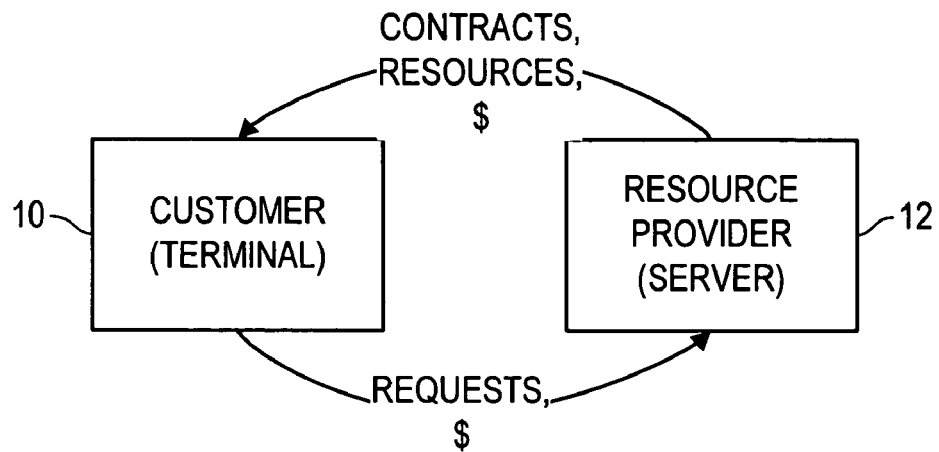
FIG. 1A is a block diagram illustrating interactions between a customer and a resource provider according to certain representative embodiments of the present invention.

FIG. 1A is a block diagram illustrating interactions between a customer 10 and a resource provider 12 according to certain representative embodiments of the present invention. As shown, the customer 10 provides compensation (e.g., in the form of cash payment) and reservation requests to resource provider 12, while resource provider 12 provides reservation contracts, resources and/or, in certain cases, compensation (e.g., cash) to customer 10.

For example, customer 10 might request a reservation for a particular resource (e.g., a seat on a particular airplane). In response, resource provider 12 provides a quotation regarding the price for the reservation and also a quotation regarding a compensation amount that the resource provider 12 will pay to the customer in the event that if the resource provider 12 is unable to deliver the resource as specified. If these terms are acceptable to customer 10, then customer 10 typically will pay some or all of the price upfront, and the resource provider 12 will deliver a reservation contract to customer 10. When the time comes for delivery, customer 10 will pay any additional portion of the price (not previously paid) and obtain the resource. On the other hand, if the resource provider 12 is unable to deliver the resource as agreed, then it will pay the agreed-upon compensation amount to the customer 10.

Typically, the customer 10 will interact with the resource provider 12 via the Internet. Thus, as shown in FIG. 1A, customer 10 typically will use a terminal such as a laptop or desktop computer or a smaller device such as a wireless telephone or personal digital assistant (PDA) that is programmed or otherwise configured to communicate with resource provider 12 across the Internet or some other publicly accessible network and to perform the customer-side functionality described herein. In turn, as also shown in FIG. 1A, resource provider 12 typically will operate a server that is accessible over such network and is programmed or otherwise configured to perform the resource-provider-side functionality described herein. However, the two entities instead might interact via telephone (e.g., using an automated voice response system) or any other communication system. In any event, resource provider 12 preferably executes automated processes for communicating with various customers (including customer 10) and for implementing the backend processing that generates the pricing structures which are presented to such customers.

Figure 1B:
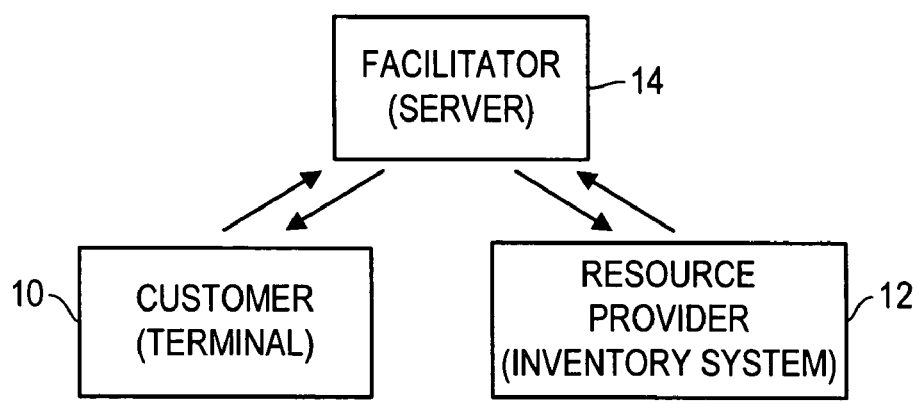
FIG. 1B is a block diagram illustrating interactions between a customer, a facilitator and a resource provider according to alternate representative embodiments of the present invention.

FIG. 1B is a block diagram illustrating interactions in which a facilitator 14 is used to facilitate transactions between the customer 10 and the resource provider 12, according to alternate representative embodiments of the present invention. Generally speaking, the facilitator 14 performs certain tasks that otherwise would have been performed by resource provider 12, but otherwise, from the perspectives of the customer 10 and the resource provider 12, the transactions are identical and the same considerations apply. In consideration for performing its tasks, the facilitator 14 typically will take some portion of the value created by the pricing structure of the present invention. That is, as discussed in more detail below, the present invention can generate pricing efficiencies that result in surplus value which can be apportioned between the customer 10, resource provider 12 and/or facilitator 14 (if used), as desired or as dictated by of the marketplace.

Facilitator 14 preferably communicates with customer 10 and resource provider 12 using the Internet, but instead may use any other communication system. In addition, facilitator 14 preferably executes automated processes for communicating with various customers (including customer 10), for implementing the backend processing that generates the pricing structures which are presented to such customers, and for communicating with resource provider 12. Thus, in this embodiment a customer 10 typically uses a communication terminal (e.g., in the same manner described above), the facilitator 14 operates the server that communicates with the customer 10 and resource provider 12 operates a back-end inventory system that interfaces with facilitator 14's system. In a still further embodiment, the customer 10 may choose to interact directly with resource provider 12 (in which case resource provider 12 also would operate an accessible server) or indirectly with resource provider 12 through facilitator 14.

Also, only a single customer 10 is illustrated in FIGS. 1A&B. Once again, this is for ease of illustration only. It will be readily understood that multiple customers typically will be interacting with an individual resource provider 12. However, generally speaking, each interaction between a customer 10 and a resource provider 12 can be considered in isolation, subject to the additional comments set forth below.

The first section of the following disclosure describes certain mathematical concepts that underlie representative embodiments of the present invention. Subsequent sections describe particular embodiments of the invention in more detail.

Mathematical Discussion.

Consider the following one-time exchange problem between two parties: a customer 10 and a resource provider 12. In this section, it generally is assumed that the resource provider 12 is a service provider (e.g., an airline). However, this is for ease of illustration only; it should be understood that the same concepts also apply to providers of goods. Also, in this section (again for ease of illustration) it is assumed that the transactions occur directly between customer 10 and resource provider 12 (as illustrated in FIG. 1A); however, as noted above the same considerations generally will apply if a facilitator 14 is used, except that in the latter case some portion of the work typically will be performed by the facilitator 14 in exchange for some portion of the value created.

For purposes of the following discussion, it is assumed that a customer 10 wants to acquire a service from a provider 12. Due to physical constraints, the service provider 12 cannot always provide the service, or cannot provide it at a satisfactory level, but can only do so with a probability $q \in [0,1]$, which in the present example is called the quality of service (QoS) or, more generally (encompassing both goods and services), can be referred to, e.g., as the probability of delivery. Assume that the service provider 12 knows the real q but the customer 10 does not. It is desirable to design a mechanism that induces the service provider 12 to report the true QoS to the customer 10.

Further consider the following contingency mechanism. The service provider 12 informs the customer 10 of a particular QoS q', which may or may not be the real QoS q. The customer 10 pays the service provider 12 a premium g(q'). If the service provider 12 fails to provide the service (e.g., to a specified level), the service provider 12 pays the customer 10 a compensation h(q').

Here $g,h:[0,1] \to \Box^+$ are two functions whose forms are to be determined. A risk-neutral customer 10 has the following form of expected utility:

$$EU_1 = qv - g(q') + (1-q)h(q'),\qquad(1.1)$$

where E is the expectation operator, v>0 is the customer's value of using the service, and $g(q')-(1-q)h(q')$ is the customer's expected cost. Similarly, assume that the service provider 12 is risk-neutral, and its expected utility is given by:

$$EU_2 = g(q') - (1-q)h(q') - c,\qquad(1.2)$$

where $c \geq 0$ is its cost. Here it is assumed that c is a fixed cost ex ante. That is, the service provider 12 has to spend this cost whether or not it can successfully provide the service later. It is further assumed that c<v, in order for there to be a motivation for the two parties to conduct business with each other.

Suppose furthermore that both parties are rational, so they maximize their own expected utilities. In particular, the service provider 12 will report the q' that maximizes $EU_2$. As the goal is to induce the service provider 12 to report the true QoS, Eq. (1.2) should be maximized at q'=q. This naturally leads to the following definition. If w(q) is the service provider's expected gross income from accurately stating the probability q that it will deliver the resource, then (g,h) is called truth-telling on an interval $I \subseteq [0,1]$ if for any $q \in I$ and any $q' \in [0,1]$ with $q' \neq q$:

$$w(q) \equiv g(q) - (1-q)h(q) > g(q') - (1-q)h(q').\qquad(1.3)$$

From this definition, the service provider 12 will report the true QoS if it is in the truth-telling interval of (g,h). If that happens, the service provider's expected gross income is w(q). Clearly, the service provider 12 will prefer using the mechanism to not selling any service when $w(q) \geq c$. On the other hand, knowing that the service provider 12 will report the real q, the customer 10 prefers using the mechanism to staying idle when $w(q) \leq v$. This observation leads to a second definition: (g,h) is called incentive-compatible on an interval $I \subseteq [0,1]$ if $c \leq w(q) \leq qv$ for all $v \in I$ (which can be derived by substituting w(q) into Equations (1.1) and (1.2) and requiring both $EU_1$ and $EU_2$ to be greater than zero).

To summarize, if (g,h) is truth-telling and incentive-compatible on some interval $I \subseteq [0,1]$, then whenever $q \in I$, the customer 10 and the service provider 12 both want to use the mechanism, and the service provider 12 will report its true QoS. The following discussion provides examples of such pairs of (g,h).

More specifically, this discussion focuses on two realizations with different forms of compensation. The most intuitive choice is to require the compensation to be proportional to the quality of service. Such a linear-compensation technique often is appropriate for non-mission-critical services. Suppose $k, c_1$ are positive numbers satisfying $c \leq c_1 \leq v - k$. Let $$q_0 = \frac{v - \sqrt{v^2 - 4kc_1}}{2k}.\qquad(1.4)$$

Then the choice $$g(q) = -kq^2 + 2kq + c_1,\ h(q) = 2kq\qquad(1.5)$$

is truth-telling and incentive compatible on $[q_0, 1]$.

Figure 2:
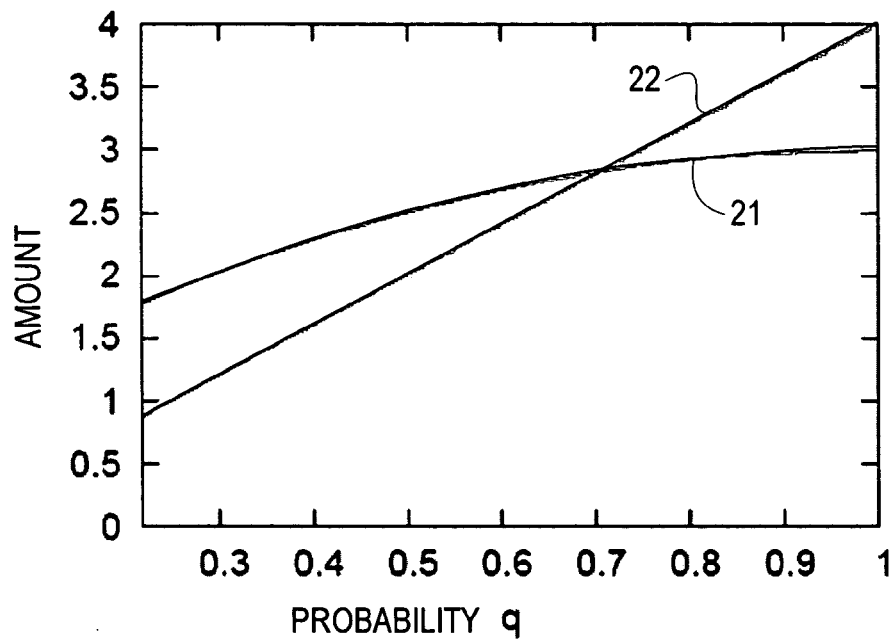
FIG. 2 is a graph illustrating the option price to be paid by a customer and the compensation to be paid by the service provider if the service provider is unable to deliver the resource across a range of probabilities corresponding to the service provider's likelihood of providing the resource, according to a representative embodiment of the present invention that employs a linear compensation technique.

Proof. Clearly, $g(q), h(q) \geq 0$ for all $q \in [0,1]$. In addition, (g,h) is truth-telling because $$g(q') - (1-q)h(q') = -k(q'-q)^2 + kq^2 + c_1\qquad(1.6)$$

is maximized at q'=q with the value $w(q) = kq^2 + c_1$. The incentive-compatibility part is just some basic algebra. FIG. 2 plots the functions g(q) 21 and h(q) 22 according to the linear-compensation technique for a particular set of parameters. The parameter k determines the curvature of the function g: the larger k, the more curved is g.

The linear-compensation technique generally is not appropriate for services which require very high reliability. For example, in certain telecommunications and financial information technology (IT) services, the quality of service often is represented by the "number of nines" that measures how close it is to 1. For example "five nines" is equivalent to q=0.99999. For these services it generally will be more appropriate to set the compensation proportional to some nonlinear function of q. One example is $-\log(1-q)$. This leads to the following design.

Logarithmic compensation. Suppose $k, c_1$ are positive numbers satisfying $c \leq c_1 \leq v - k$. Let $q_0 = (c_1 + k)/v$. Then the choice $$g(q) = kq + c_1,\ h(q) = -k \log(1-q)\qquad(1.7)$$

is truth-telling and incentive-compatible on $[q_0, 1)$.

Proof. Under our assumptions, $g(q), h(q) \geq 0$ for $q \in [0,1)$. Consider the function $$G(q') = g(q') - (1-q)h(q') = kq' + c_1 + k(1-q)\log(1-q').\qquad(1.8)$$

The first order condition $$G'(q') = k\frac{q - q'}{1 - q'} = 0\qquad(1.9)$$

is satisfied when q'=q. Because $$G''(q') = -k\frac{1-q}{(1-q')^2} < 0,\qquad(1.10)$$

G(q') is maximized at q'=q with the maximum value $$w(q) = k(1-q)\log(1-q) + kq + c_1.\qquad(1.11)$$

Thus (g,h) is truth-telling on [0,1).
Because $$w'(q) = -k \log(1-q) \leq 0,\qquad(1.12)$$

$w(q)$ is nondecreasing on [0,1). In accordance with the assumptions above, $$w(0)=c_1 \geq c, \quad (1.13)$$

$$w(1-)=c_1+k=q_0v. \quad (1.14)$$

Thus (g,h) is incentive-compatible on $[q_0,1)$.

Figure 3:
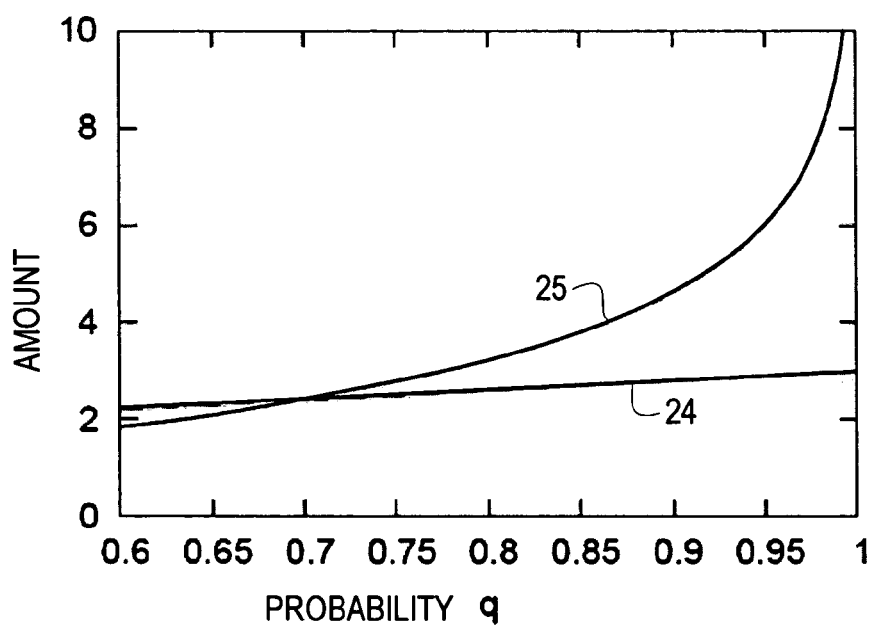
FIG. 3 is a graph illustrating the option price to be paid by a customer and the compensation to be paid by the service provider if the service provider is unable to deliver the resource across a range of probabilities corresponding to the service provider's likelihood of providing the resource, according to a representative embodiment of the present invention that employs a logarithmic compensation technique.

FIG. 3 plots the functions $g(q)$ 24 and $h(q)$ 25 according to the logarithmic-compensation technique for a particular set of parameters. The parameters for both FIGS. 2 and 3 are $c=1$, $v=5$, $k=2$, $c_1=1$. The incentive-compatibility interval is [0.219,1] for the linear-compensation technique of FIG. 2 and [0.6,1] for the logarithmic-compensation technique of FIG. 3. In both of FIGS. 2 and 3, the curve $g(q)$ is the premium paid by the customer 10 and $h(q)$ is the compensation paid by the service provider 12 if unable to deliver the resource.

In both of the foregoing examples, the pair (g,h) is truth-telling in the full interval [0,1]. It is the incentive-compatibility requirement that restricts the applicable interval. Therefore, once the service provider 12 decides to participate, it can be expected that the service provider 12 will be truth-telling. In both examples, $q_0 \to 0$ as $v \to \infty$. In words, the more valuable the service, the larger is the incentive-compatible interval.

In the discussion above, QoS is described as the probability that the service provider 12 can successfully provide the service. The probability q thus captures the random nature of supply. A second probability p is now introduced to describe the randomness of demand. For simplicity, assume that there are two periods: 1 and 2. With probability p, the customer 10 will need one unit of service in period 2, and the customer 10 knows this probability of needing it in period 1. The service provider 12 wishes to know the real p in period 1 so that the service provider 12 can set up the correct quota of service beforehand at a relatively low cost. The following discussion describes a contingent contract that incentivizes the customer 10 to report its probability of usage truthfully, using p and q to denote actual probabilities and using p' and q' to denote reported probabilities (e.g., where the value or utility to the customer 10 is at least approximately maximized by the customer 10 selecting an available sub-option that most closely matches the customer's own estimate of his or her p). It should be noted that the reporting of either of such quantities p and q can be explicit or implicit, depending upon the particular embodiment.

(Period 1) The service provider 12 tells the customer 10 the service provider's QoS q', which may or may not equal the true QoS q.

(Period 1) The customer 10 tells the service provider 12 a probability p' that the customer 10 will need the service in period 2, which may or may not be equal to p.

(Period 1) The customer 10 pays the service provider 12 a premium $g(p',q')$.

(Period 1) The service provider 12 engages in efforts directed toward preparing p' unit of service for the customer 10.

(Period 2) If the service provider 12 cannot provide the service (which happens with probability 1−q), the service provider 12 pays the customer 10 a compensation $h(p',q')$. Otherwise, the customer 10 can get the service at the price $f(p')$ if the customer 10 needs it.

Using the foregoing mechanism, the customer's expected cost is $$EC(p',q')=g(p',q')+pqf(p')-(1-q)h(p',q'). \quad (1.15)$$

In period 2, the customer 10 gets value v if the customer 10 needs the service and can obtain it. Hence the customer's value in period 1 can be described by a random variable $$V = \begin{cases} v & \text{with probability } pq, \\ 0 & \text{with probability } 1-pq. \end{cases} \quad (1.16)$$

So the customer's expected utility in period 1 is $$EU_1=E[V-C]=pqv-EC. \quad (1.17)$$

The service provider 12 collects an expected EC from each customer 10 and its cost is cp. Thus, the service provider's expected utility is $$EU_2=EC-cp. \quad (1.18)$$

If both parties are rational and risk-neutral, then the service provider 12 maximizes $EC(p',q')$ for q' while the customer 10 minimizes $EC(p',q')$ for p', so they are playing a constant-sum game.

Similar to the pure QoS problem, two definitions apply: First, (g,f,h) is called truth-telling on a region $I \subseteq [0,1]^2$ if for any $(p,q) \in I$ and any $(p',q') \in [0,1]^2$ with $(p',q') \neq (p,q)$:

$$w(p,q) \equiv g(p,q)+pqf(p,q)-(1-q)h(p,q) \quad (1.19)$$

$$> g(p',q')+pqf(p',q')-(1-q)h(p',q'). \quad (1.20)$$

Second, (g,f,h) is called incentive-compatible on a region $I \subseteq [0,1]^2$ if $cp \leq w(p,q) \leq pqv$ for all $(p,q) \in I$.

According to the above definitions, if (g,f,h) is truth-telling and incentive-compatible on some region $I \subseteq [0,1]^2$, then whenever $(p,q) \in I$, the customer 10 and the service provider 12 both want to use the mechanism. The customer 10 reports its true probability of usage, and the service provider 12 reports its true QoS. The following discussion shows that such triplet (g,f,h) does exist.

Following the linear-compensation scheme, it is possible to design the following functions which are truth-telling and incentive-compatible.

First, consider the following choice of (g,f,h):

$$g(p',q')=k_1p'^2-k_2q'^2+2k_2q'+c_1, \quad (1.21)$$

$$f(p')=-2k_1p'+c_2, \quad (1.22)$$

$$h(p',q')=k_1p'^2+2k_2q'+c_3, \quad (1.23)$$

where $k_1,k_2,c_1,c_2,c_3$ are positive numbers satisfying $c_2 \geq 2k_1$, $c_1-c_3 \geq c$ and $c<c_1+c_2-k_1+k_2<v$. Then, there exist $p_0<1$ and $q_0<1$ such that (g,f,h) is truth-telling and incentive compatible on $[p_0,1] \times [q_0,1]$. Furthermore $p_0, q_0 \to 0$ as $v \to \infty$.

A proof of the foregoing assertion is as follows. It can be calculated that for this choice of (g,f,h):

$$EC(p',q')=k_1q(p'-p)^2-k_2(q'-q)^2-k_1p^2q+k_2q^2+c_3q+c_2pq+c_1-c_3, \quad (1.24)$$

so $(p',q')=(p,q)$ is a saddle point of $EC(p',q')$. Thus, (g,f,h) is truth-telling on $[0,1]^2$. From Eq. (1.24) it can be seen that $$w(p,q)=-k_1p^2q+k_2q^2+c_3q+c_2pq+c_1-c_3. \quad (1.25)$$

By assumption, $cp<w(p,q)<vpq$ at $p=q=1$. By continuity, there exists a region $[p_0,1] \times [q_0,1]$ on which $cp<w(p,q)<vpq$.

Next, it is shown that for any $p_0,q_0>0$ there exists v large enough such that (g,f,h) is incentive-compatible on $I=[p_0,1] \times [q_0,1]$. Because I is compact, the continuous function $w(p,q)$ achieves its maximum value $w_M$ on I. If v is selected to be sufficiently large that $vp_0q_0 \geq w_M$, then $w(p,q) \leq w_M \leq vp_0q_0 \leq vpq$ for $(p,q) \in I$. For the other direction, note that $$\frac{\partial w}{\partial q} = c_2 p - k_1 p^2 + 2k_2 q + c_3 > 0, \quad (1.26)$$

so w is increasing in q. Therefore, for $(p,q) \in I$:

$$w(p,q) \geq -k_1 p^2 q_0 + k_2 q_0^2 + c_3 q_0 + c_2 p q_0 + c_1 - c_3 > c_1 - c_3 \geq cp. \quad (1.27)$$

Hence (g,f,h) is incentive-compatible on I.

Besides the obvious advantages that the foregoing mechanism brings to the problem of determining QoS in single exchanges and truth-telling when reservations are made, there are other scenarios which can also profit from it. Some of these additional scenarios are characterized by the fact that resources are finite and, thus, reservations of them can lead to severe overbooking problems. For example, consider the case where there are m available units of resource (plane seats, conference rooms, etc.) and n customers. Each customer potentially might need to consume one unit in period 2. If $n \leq m$ then the foregoing reservation mechanism for infinite resource generally works without problems. If n>m however, the service provider 12 can no longer guarantee the delivery of one unit in period 2, even if the customer 10 reserved it in period 1.

This is known as the overbooking problem. One method to deal with it, used for example in the airline industry, holds an auction at period 2 until enough customers surrender their reservations for monetary compensation. This process is often expensive to the service provider 12 and can be gamed by some customers willing to benefit from such compensation. The mechanism described above can address this problem in the following fashion.

Suppose n customers arrive and make reservations one after another. In period 2 when they claim their needs, they are satisfied one by one in the order of their arrivals, until there are no more available resources left. The first m customers for sure can be satisfied, so in period 1 the coordinator simply sells them m plain truth-telling options with q=1 as in the infinite resource problem, and the customers truthfully report their probabilities of needing one unit of resource in period 2, which will be denoted $p_1, \ldots, p_m$.

Now, consider the (m+1)'th customer. The first m probabilities $p_1, \ldots, p_m$ known by the service provider 12 can help the service provider 12 to estimate the QoS $q_{m+1}$ for the (m+1)'th customer. For example, under the assumption that the customers' usage probabilities are independent, with probability $p_1 \ldots p_m$ the first m customers will each need one unit of resource in period 2. If that happens, customer m+1 cannot be satisfied. Therefore, the probability $q_{m+1} = 1 - p_1 \ldots p_m$ can be regarded as the QoS for the (m+1)'th customer. Thus, the coordinator sells the (m+1)'th customer an option with QoS $q_{m+1}$, and the (m+1)'th customer reports its true probability of using one unit of resource in period 2, denoted by $p_{m+1}$. Once the coordinator knows $p_{m+1}$, it can calculate the quality of service for the (m+2)'th customer, and can sell the (m+2)'th customer an option with QoS $q_{m+2}$ and so on. If everyone is risk-neutral and rational, then all the probabilities p and q will be truthful.

The effectiveness of the procedure just described depends on the accuracy of the estimation of $q_i$ from $p_1, \ldots, p_{i-1}$, a problem similar to time-series predictions. If the estimation process is not designed appropriately, the error may accumulate and propagate to the very last step, i.e., the service provider 12 will systematically err in estimating QoS for all subsequent customers.

Use of the Mathematical Concepts

The following is a recap of some of the functions and variables discussed above, together with a generalized description of each:

c: Service provider's cost of attempting to provide the resource f: Purchase price to be paid by the customer 10 g: Option price paid by the customer 10 h: Compensation paid by the service provider 12 if unable to deliver the resource p: Customer's likelihood of needing the resource q: Service provider's likelihood of providing the resource v: Value to the customer 10 from using the resource w: Service provider's expected gross income Various specific techniques for using these functions and variables are discussed in more detail below, with references to certain formulas above that may be used to calculate such values. Generally speaking, however, for the purposes of pricing the reservation of a unit of resource, the service provider 12 (or facilitator 14) initially will identify its q of being able to deliver the resource. Then, based on that value of q, service provider 12 (or facilitator 14) will calculate (or read from a graph) g, f (if used) and h. As described in more detail below, these may be calculated as constant values once q is input or may be presented as functions of p, in the latter case giving the customer 10 the ability to select the triplet that is most desirable from his or her point of view (i.e., that most closely matches his or her own estimate of p). Also, in this latter case, g, f (if used) and h initially are functions of both p and q, and the service provider 12 (or facilitator 14), by specifying its q, causes such functions to be dependent upon p alone. Of course, in the former case g, f (if used) and h initially are functions only of q. In either case, each of g, f (if used) and h generally will be nonzero across the options to be selected by the service provider 12 (or facilitator 14), each corresponding to a different value of q, and any sub-options to be selected by customer 10, each corresponding to a different value of p.

Once again, the foregoing description provides just a general overview of certain techniques according to the present invention. Specific embodiments are now described in more detail.

First Class of Representative Embodiments

Figure 4:
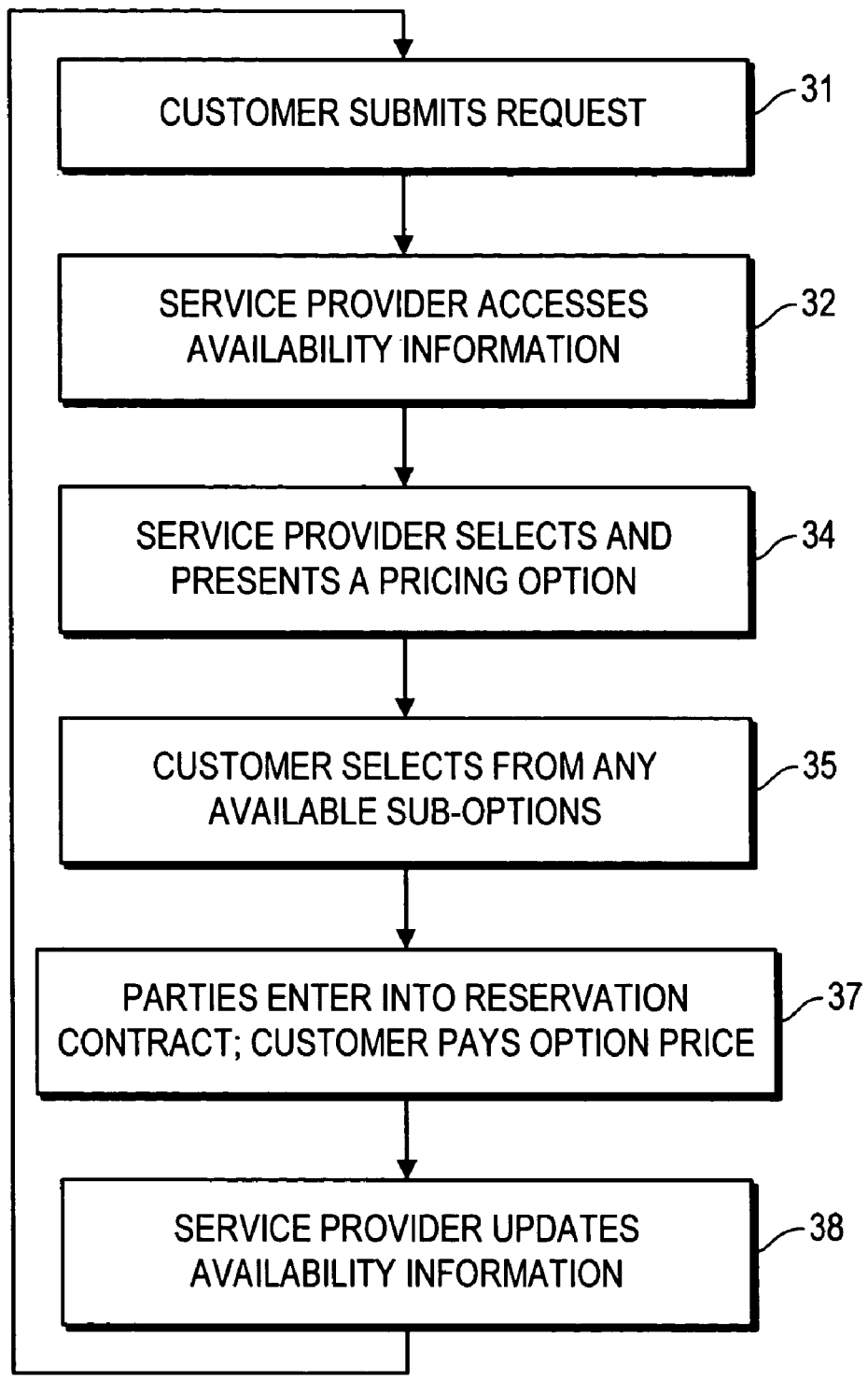
FIG. 4 is a flow diagram illustrating a technique for pricing and entering into a resource-reservation contract according to certain representative embodiments of the present invention.

FIG. 4 is a flow diagram illustrating a technique of pricing and entering into a resource-reservation contract according to certain representative embodiments of the present invention. The process of FIG. 4 generally assumes direct interaction between a customer 10 and a resource provider 12, as illustrated in FIG. 1A. However, in certain cases the discussion also notes considerations that apply when a facilitator 14 is used, as illustrated in FIG. 1B.

Figure 5:
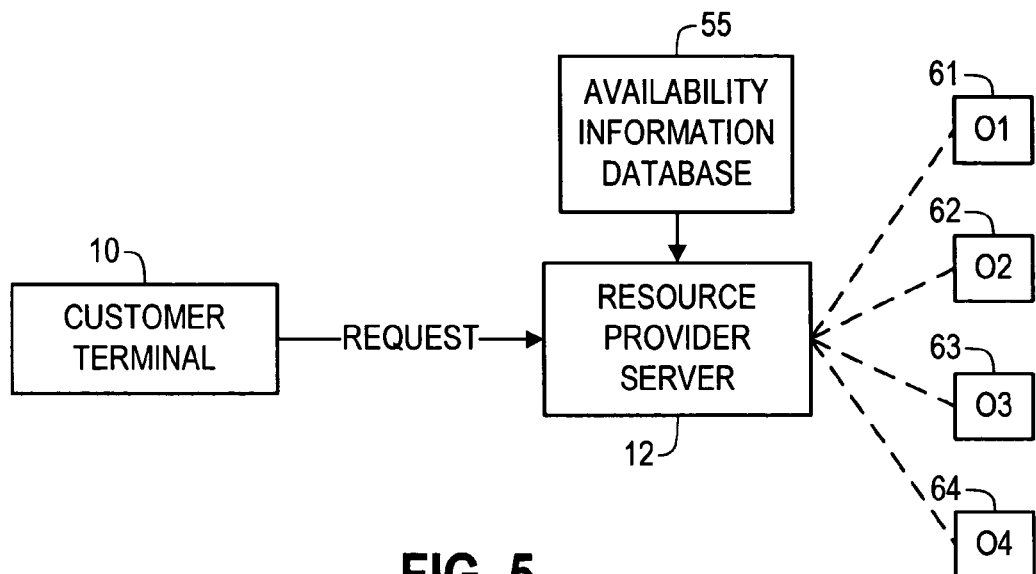
FIG. 5 is a block diagram illustrating a customer's submission of a request and a resource provider's selection of a pricing option according to a representative embodiment of the present invention.

Initially, in step 31 customer 10 submits a request for a quotation with respect to potentially reserving a specified resource. A block diagram illustrating the interactions for the first few steps of the process is shown in FIG. 5. As noted above, the resource can be any good or service. However, the present invention is particularly useful in connection with reservations of time-dependent resources (e.g., airline tickets or show tickets) because in such a case the failure to closely match consumption demand with available supply at the particular time that pertains to the resource results in greater inefficiencies than typically exist with resources that are largely independent of any particular time.

The customer 10 typically will provide adequate information to identify the resource or resources that it potentially is interested in obtaining. For example, the customer 10 might specify a coach seat on a particular flight or instead, e.g., where the specific departure time or the specific airline is not too critical, might specify a coach seat on any of multiple designated flights.

In step 32, the resource provider 12 accesses availability information 55 (shown in FIG. 5) in order to determine the probability q that it will be able to deliver the subject resource. Typically, the two most important factors in evaluating q are the physical supply that is available (or is likely to be available) and the number and nature of existing reservation contracts pertaining to the subject resource.

Keeping with the example given above pertaining to an airplane seat, the resource provider 12 preferably first determines the total number of seats N that are available within the criteria for the subject resource. Next, the resource provider 12 considers the number of seats reserved and the stated or implied probabilities p' that the customers who reserved them actually will use them. The calculation $$\bar{R} = \sum_i p'_i$$

will determine the average number of seats $\bar{R}$ that will be taken (assuming that each stated or implied p' is equal to the true value of the corresponding p which, as described elsewhere herein, should be a reasonable assumption if the pricing structures are created to incentivize the customers to state p accurately, and further assuming that each reservation corresponds to one unit of the resource). Then, assuming that there are a large number of existing reservations and that they are independent of each other, R will have a normal distribution, in accordance with the central limit theorem. By further assuming a variance for the p associated with each existing reservation contract, it is a straightforward matter to determine a probability q that $R \leq N-1$.

Of course, other techniques instead may be used to determine q. For example, N might be modeled as a random variable (e.g., due to the fact that some flights might be canceled due to mechanical problems or because of poor weather). In addition, other factors and/or assumptions may be taken into account in calculating q. Each of R and N can be modeled as a deterministic quantity whose value changes over time as new information is learned or can be modeled as a random variable whose mean and distribution change over time as new information is learned.

For example, R typically will be modeled as a random variable if the system is structured so as to obtain values of p', at least from some of the customers, and otherwise will be modeled as a deterministic value. In either event, in addition to taking into account existing reservation contracts, resource provider 12 might also consider an estimate of last-minute demand and the ability to charge a premium for a last-minute sales of the resource. However, the use of reservation contracts in accordance with the present invention typically will tend to lessen such opportunities.

As to N, any of a variety of different supply-chain factors (which typically will vary depending upon the nature of the resource) may be taken into account, including, for example, weather, employee strikes, shipping difficulties, problems with component suppliers, etc. The model for determining N can be as simple or as complicated as desired by the resource provider 12.

It is noted that another approach to determining q is to simply make a rough estimate of it based on predefined heuristics. Similarly, the techniques of the present invention do not require the determination of a specific value for q, as described in more detail below.

In step 34, resource provider 12 selects a pricing option from a number of available pricing options (e.g., options 61-64, as shown in FIG. 5). It is noted that although four options 61-64 are shown in FIG. 5, any other number of options instead may be available. More generally, options 61-64 may represent any finite or infinite set of options, as discussed in more detail below. In the preferred embodiments of the invention, each pricing option includes at least one price g for reserving the subject resource and at least one compensation amount h to be paid by resource provider 12 in the event it does not (e.g., is unable to) deliver the resource as agreed.

If a specific value has been calculated or estimated for q, then it is possible to calculate g and h, e.g., in accordance with Equation (1.5) above if linear compensation is being used or Equation (1.7) above if logarithmic compensation is being used. Alternatively, if no such value has been calculated or estimated, then it is possible to simply: calculate g and h (e.g., in accordance with Equation (1.5) or (1.7) above) for multiple values (e.g., 3-8 different values) of q, and present the matched pairs to the resource provider 12 in order to select one. Graphically, this process amounts to reading the values for g and h from FIG. 2 or 3, for linear or logarithmic compensation, respectively, and based on the identified value for q. It is noted that if an exact value has been determined for q, an infinite number of potential pricing options are available (i.e., corresponding to a continuous range of q, between 0 and 1), whereas if only a rough estimate is used, typically only a discrete number of potential pricing options are made available for selection. However, as a practical matter, given the general inability to identify q with significant accuracy, a small discrete number of options usually should be adequate.

In the foregoing embodiments, the reservation price g is the total amount that is paid to reserve and acquire the resource, i.e., entitling the customer 10 to delivery of the resource at the specified time or compensation in the amount of h. Ordinarily in these embodiments, g would be paid as a single lump sum, but instead it could be paid in installments.

For other embodiments, there is both a reservation price g and then later, if customer 10 decides to actually use or acquire the subject resource, a purchase price f would need to be paid. In such embodiments, g functions as an option price (giving customer 10 the right to purchase the resource at an exercise price) and f functions as the exercise price. The values of f,g,h can then be calculated, e.g., in accordance with Equations (1.21)-(1.23) above. As indicated in the equations above, each of g,f+g (if f is used) and h preferably increase with q, so that, for example, if one option has a higher g than another, it also will have a higher h.

In any event, each of the plurality of options from which the resource provider 12 is able to select preferably corresponds to an underlying likelihood (e.g., q) that the resource provider 12 will provide the resource at the specified future time. Thus, the selection of an option (e.g., one of options 61-64) at least will constitute an implicit designation of q.

In the specific embodiments described herein and in the preferred embodiments of the invention, the available options are constructed so as to incentivize the resource provider 12 to select the one that most closely matches its own estimate of q (e.g., the one that at least approximately maximizes the expected value or utility to the resource provider 12 across all available options).

It is noted that Equations (1.21)-(1.23) contemplate the use of a value p'. This value can be set equal to 1, resulting in a single value for each of f,g,h. That triplet of values then would be presented to the customer 10 for the customer 10 to decide whether or not to enter into the reservation contract. As in the embodiments mentioned above, the specific values of f,g,h can be calculated if the resource provider 12 has calculated or estimated a value for q. Otherwise, a number of precalculated options may be presented to resource provider 12 for selection of one.

Figure 6:
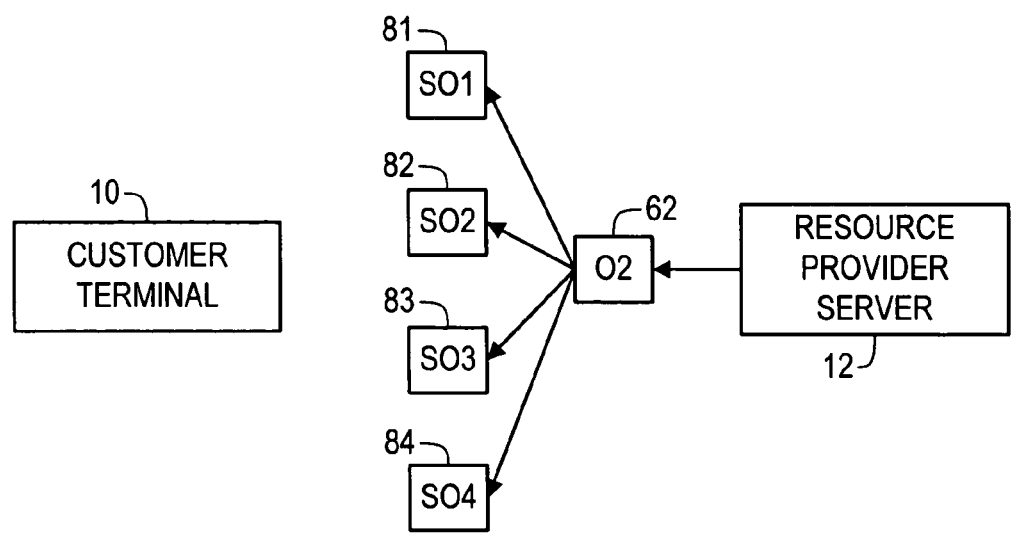
FIG. 6 is a block diagram illustrating the presentation of pricing sub-options to a customer according to a representative embodiment of the present invention.

On the other hand, rather than setting p' to 1, in certain embodiments of the invention the customer 10 is free to designate p', either explicitly or implicitly. In this regard, resource provider 12 would select an option for f,g,h (e.g., in any manner discussed above but, preferably, by specifying a particular value for q). However, in these embodiments each of f,g,h actually would be a function of p'. As a result, the option selected by resource provider 12 (e.g., option 62 as shown in FIG. 6) would have a number of sub-options (e.g., sub-options 81-84, as also shown in FIG. 6). Customer 10 then would select one of such sub-options.

Because the functions f,g,h are continuous functions of p' it is feasible to make available to customer 10 an infinite number of potential sub-options, with the customer 10 selecting one by inputting its estimate of p'. In practice, however, it generally will be preferable to provide the customer 10 with a discrete number of selections for f,g,h (e.g., 3-8 different sub-options) and then allow the customer 10 to select one of such sub-options. In one example, the values of f,g,h are precalculated for p' of 0.2, 0.4, 0.6 and 0.8.

The reasons for this are discussed in commonly assigned U.S. patent application Ser. No. 11/351,955, filed Feb. 10, 2006, by the present inventors, and titled "Resource Distribution", which application is incorporated by reference herein as though set forth herein in full. The foregoing application primarily concerns systems, methods and techniques for inducing customers to accurately state p. The same considerations set forth therein with respect to p also apply to q. For example, the present invention also generates entirely new information (e.g., with respect to estimates of q) that can be used for predicting a variety of different financial and economic quantities.

In step 35, the customer 10 selects from any available sub-options. As noted above, a single option may be presented to customer 10 or multiple sub-options may be presented. In the former case, the customer 10 simply decides whether or not to enter into a reservation contract on the stated terms. In the latter case, the customer 10 also decides which sub-option to elect. As noted above, in this latter case the values of f,g,h preferably are determined so as to incentivize customer 10 to select the sub-option that most closely matches its true probability p of needing the resource (e.g., the sub-option that maximizes the expected value or utility to customer 10). Specific functions for achieving such incentive-compatibility are derived above; however, others may be used instead.

In step 37, the customer 10 and resource provider 12 enter into a reservation contract which allows the customer 10 to obtain one unit of the resource upon payment of f, if any, or to receive h from the resource provider 12 if the resource provider 12 does not deliver the resource. In certain embodiments of the invention, h is only paid if customer 10 attempts to tender payment of f in order to purchase the resource. In other embodiments, particularly those in which no separate payment of f is required, the resource provider 12 pays the agreed-upon h to each customer who has entered into a reservation contract but for whom a unit of the resource is not available. In any event, upon entering the reservation contract, customer 10 typically will pay g, or at least some portion of it, upfront. However, it also is possible for customer 10 simply to agree to pay g upon entering into the reservation contract (a form of extension of credit).

In step 38, the resource provider 12 updates availability information 55 to account for the new reservation, indicating the value of p' if provided by customer 10 (explicitly or implicitly), as discussed above. As noted above, if a discrete number of sub-options is presented to the customer 10, each will have an underlying p' associated with it. Accordingly, the customer's selection of a particular sub-option constitutes an implicit designation of that underlying value of p'.

It is noted that in certain embodiments of the invention, step 31 is omitted, with the process starting with and then looping back to step 32. In such embodiments, the resource provider 12 updates its available pricing structure on a continual basis (as circumstances change), rather than in response to specific requests by customers. One drawback of such an alternate embodiment is that it eliminates some flexibility from the system. For example, in the particular embodiment described above a particular customer 10 has flexibility in designating the acceptability criteria for the resource (e.g., in the specific example noted above, the customer 10 has the ability to designate multiple different flights that are acceptable to it). As a result, the resource provider 12 can, if it chooses, customize its pricing structure based on those personally specified criteria (e.g., by setting up its option-generating processor to evaluate the probability that a seat will be available on at least one of the designated flights).

On the other hand, the generation of pricing structures independently of submitted customer requests will tend to be more rigid and result in less optimal results. For example, if the resource provider 12 merely posts the pricing structure for individual flights (e.g., updated on a real-time basis), the customer 10 generally will be forced to select only one of them when entering into a reservation contract. However, the probability q of availability almost always will be higher (and never lower) across multiple instances of a resource (e.g., multiple different flights) then it will be for a single instance (e.g., a single flight).

Accordingly, in an alternate embodiment of the invention, resource provider 12 provides real-time quotations of the pricing structures for individual instances of a particular resource, but also allows the customer 10 to designate multiple instances (or other more broadly encompassing criteria) for which a customized pricing structure can be obtained from the resource provider 12. For example, if the customer 10 is willing to accept a seat on any of a number of different flights (which may include different carriers and/or different times), the customer 10 would identify the acceptable flights. In response, the resource provider 12 first would estimate the probability q that at least one of those flights will have an available seat when the time for delivering the resource arrives. Then, resource provider 12 can create a custom pricing structure using that value of q and present to customer 10 a number of pricing options, each corresponding to a different probability p, for the customer 10 to select depending upon his or her circumstances (i.e., own estimate of p).

Such an embodiment often will provide the dual advantages of allowing a customer 10 to obtain quotations with very little effort and then, with a little more effort, to obtain custom quotations that almost always will provide the customer 10 with a "better deal". Moreover, from the perspective of resource provider 12, such customized quotations also are advantageous because they provide information regarding the customer's flexibility that can allow better allocation of its available resources. The end result often will be enhanced efficiency, and the resulting added value can be divided in any appropriate manner between the customer 10, resource provider 12 and facilitator 14 (if used).

The foregoing technique all occurs in the first period. In the second period, assuming no f has been specified in the reservation contract, the resource provider 12 either delivers the subject unit of resource or pays customer 10 the agreed-upon h. Alternatively, customer 10 pays or offers to pay f if it wishes to obtain the unit of resource and receives h from resource provider 12 if the resource is unavailable. As noted above, it also is possible for the reservation contract to specify that customer 10 receives h even if customer 10 does not offer to pay f.

Second Class of Representative Embodiments

Figure 7:
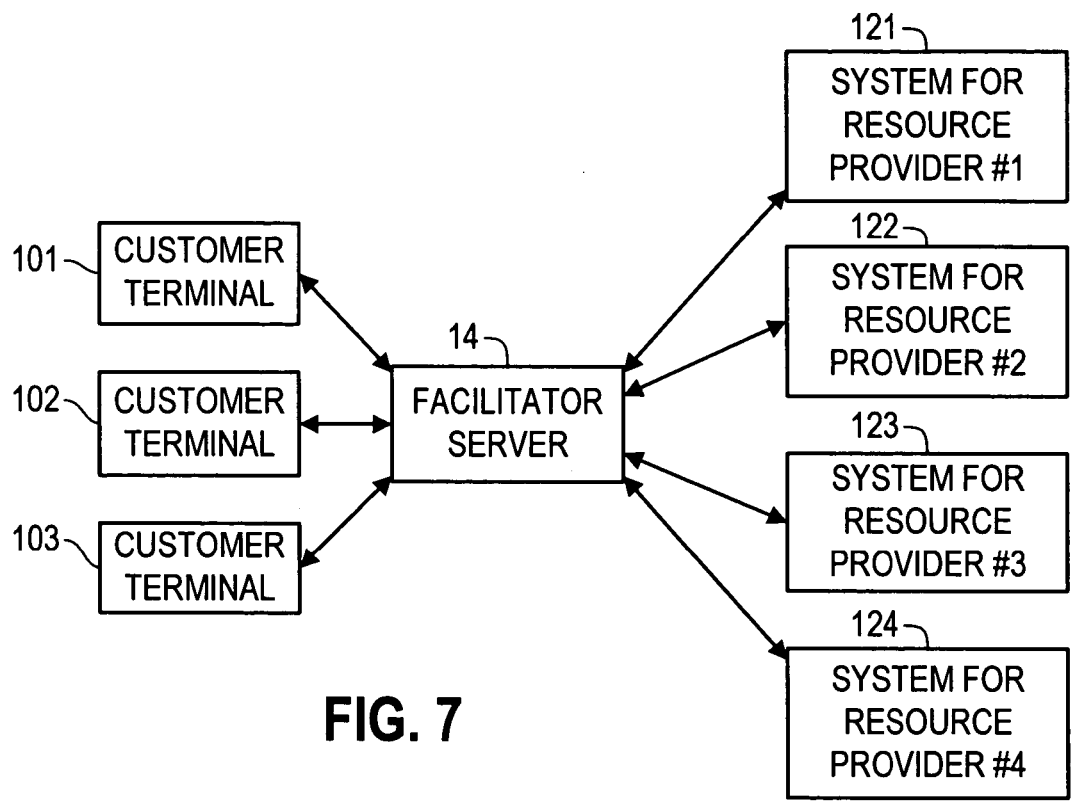
FIG. 7 is a block diagram illustrating the use of a facilitator for facilitating transactions between customers and multiple different resource providers, according to certain representative embodiments of the present invention.

FIG. 7 is a block diagram illustrating the use of a facilitator 14 for facilitating transactions between multiple different customers 101-103 and multiple different resource providers 121-124, according to certain representative embodiments of the present invention. Although three customers and four resource providers are illustrated in FIG. 7, this is for purposes of illustration only. Any other number of customers and resource providers may be accommodated by systems of the present invention. Typically, facilitator 14 communicates with only a single customer at a time, but in certain cases communicates with multiple resource providers simultaneously, e.g., where facilitator 14 is requesting pricing quotations.

As noted above, in one sense the facilitator 14 simply acts as an intermediary between any individual customer and any individual resource provider, handling the administrative tasks associated with presenting the initial set of options to the resource provider, presenting any sub-options to the customer and then managing the reservation contracts. Its compensation is then some portion of the difference between the value to the resource provider and the value to the customer.

In addition, when used within the structure of FIG. 7, a facilitator 14 actually can add value to the overall process. For example, as noted above, the value of q almost always can be increased when aggregating across multiple instances of the same resource (or similar resources). Thus, by simultaneously dealing with multiple resource providers 121-124, facilitator 14 can increase the likelihood that a requested unit of resource will be available.

In addition, by aggregating customer reservations across not just one resource provider, but multiple resource providers, a greater total number of reservations for similar resources can be accumulated. As a result, the overall variance of the expected usage typically can be reduced.

Finally, the purchasing volume of such a facilitator 14 should permit it to obtain good pricing from the individual resource providers. An example will help to illustrate the increased efficiencies of the structure shown in FIG. 7.

Assume that each of the resource providers 121-124 is a different airline, each offering a comparable flight (e.g., same arrival and departure cities, similar total flight times and similar departure times). Assume further that flight can accommodate 200 passengers, so that each airline individually could secure 250 reservation contracts with an average p of the 0.8. However, if they do so individually the corresponding variances will mean that some planes will be over-booked, requiring payment of h, and some will be under-booked, resulting in a lost opportunity to sell the empty seats.

Now, if facilitator 14 aggregates across all four resource providers 121-124, 1000 reservation contracts with an average p of the 0.8 might still be made, but in this case the total variance would be lower because over-bookings on one airline could be offset by under-bookings on another. Moreover, due to its presumed purchasing power a purchase agreement could be entered into with the resource providers 121-124 such that any shortfall in reservations made by facilitator 14 could be cured by purchasing last-minute tickets (to the extent available) from such resource providers 121-124 at pre-negotiated discount prices.

In short, by aggregating across multiple customers 101-103 and multiple resource providers 121-124, a facilitator 14 is better able to predict demand and cover supply. As a result, fewer payments of h typically will have to be made. The value added could then be retained as profit by facilitator 14, in addition to the compensation that the individual resource providers 121-124 would be willing to pay to it for performing the administrative tasks to implement the system of the present invention.

In short, in the structure illustrated in FIG. 7 the facilitator 14 itself can function as a resource provider, having access to multiple sources 121-124 from which to obtain a resource matching a customer's request. Accordingly, the entire discussion above pertaining to resource provider 12 could, in this embodiment, also apply to facilitator 14, but with facilitator 14 able to achieve the advantages described in this section.

In order to cover the demand from its customers 101-103, facilitator 14 purchases or reserves resources from any or all of resource providers 121-124. In one embodiment, in which the resource providers 121-124 are simply conventional merchants, the facilitator 14 simply purchases a number of units that is expected to maximize its value (excess inventory that is not needed against the risk of under-supply that would require payment of h). On the other hand, if one or more of the resource providers 121-124 also offers reservation contracts (e.g., as described herein), then facilitator 14 preferably purchases a number of units outright (e.g., the number that it almost certainly will end up requiring) and enters into reservation contracts for other units (e.g., the ones that are more speculative). More preferably, facilitator 14 enters into reservation contracts at different values of p in an attempt to simulate its estimated probability distribution for the units required.

Third Class of Representative Embodiments

In the embodiments discussed above, the resource provider 12 or facilitator 14 either implicitly or explicitly identifies its q, selects a pricing option corresponding to that q, and then provides the corresponding pricing structure to the customer 10. In the usual case, as more and more units of resource are reserved it can be expected that at some point the value of q will begin to decline. In other words, the early customers get pricing structures that are based on the more favorable values of q.

However, it might be the case that a later customer 10 wants the benefit of a higher q. For example, the consequences of not having the resource delivered to customer 10 might be very severe, so at the very least the customer 10 will want to be more highly compensated if the resource cannot be delivered to it than is indicated by the pricing structure in accordance with the current value of q.

Figure 8:
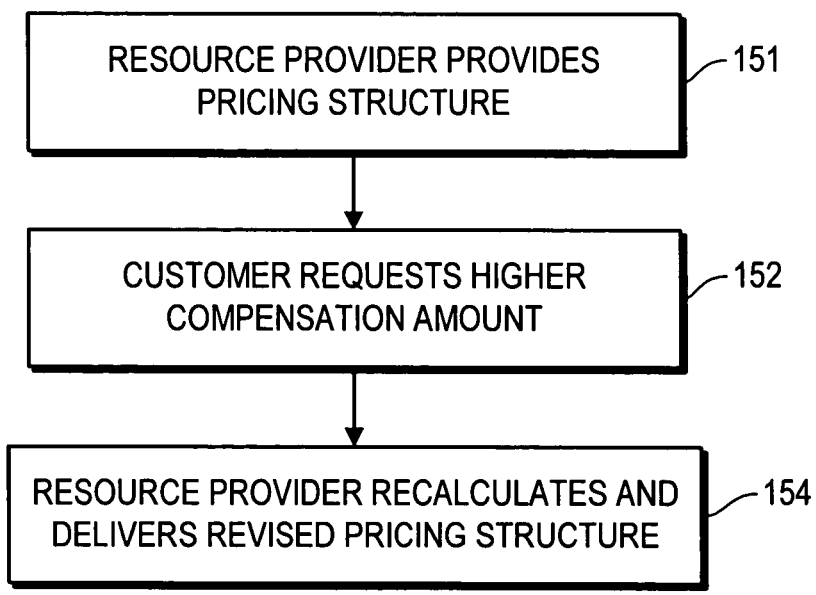
FIG. 8 is a flow diagram illustrating a technique, according to representative embodiments of the invention, in which the customer is permitted to request a higher compensation to be paid to it if the resource is not delivered as agreed.

The present class of embodiments addresses the situation by allowing the customer 10 to request a higher value of q or, alternatively, to request a higher compensation amount if the reserved resource is not provided to it. An exemplary process is now described with reference to FIG. 8.

Initially, in step 151 the resource provider 12 or facilitator 14 provides its pricing structure to the customer 10, e.g., in any manner described above. In response, in step 152 requests a higher compensation amount h or, alternatively, a higher q.

In response, in step 154 the resource provider 12 or facilitator 14 calculates the appropriate adjustments and communicates the revised pricing structure to the customer 10. In this regard, the resource provider 12 or facilitator 14 already has entered into a number of reservation contracts. Accordingly, if necessary, the resource provider 12 or facilitator 14 can divert one unit of resource away from any of such other customers at a cost of the corresponding h. The calculation of the premium to charge the current customer 10 preferably is based on this information. Thus, assuming a current q, then with probability 1−q the resource provider 12 or facilitator 14 will have to pay some h to divert the unit of resource, so the current premium should be approximately h (1−q), assuming that the earlier contract was with respect to a q that is very close to 1 and the current customer 10 wants a q very close to 1. Adjustments can then be made if any of these assumptions are significantly incorrect or if p<1.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of establishing a pricing structure for reserving a resource, comprising:
   selecting, by a computing device, an option from among a plurality of available options with respect to delivery of a resource at a specified future time; and
   presenting the selected option to a customer,
   wherein each of the plurality of options includes: (i) a reservation price at which the customer reserves the resource, and (ii) a compensation amount that must be paid if the resource is not delivered at the specified future time,
   wherein the specified future time comprises at least one of a point in time and an interval of time,
   wherein for each of the plurality of options, both the reservation price and the compensation amount are non-zero, and
   wherein each of the plurality of options corresponds to an estimate that the resource will be provided at the specified future time, and for each of the plurality of options, the reservation price is set in accordance with a price function and the compensation amount is set in accordance with a compensation function, and wherein both the price function and the compensation function are functions of the estimate.

2. A method according to claim 1, wherein the plurality of options includes at least three options.

3. A method according to claim 1, wherein for any pair of a first option and a second option selected from the plurality of options, if the first option corresponds to a higher reservation price than the second option, then the first option also corresponds to a higher compensation amount than the second option.

4. A method according to claim 1, wherein for each of the plurality of options, the reservation price and the compensation amount at least approximately maximize a supplier's expected value if the estimate matches a true likelihood that the resource will be provided to the customer at the specified future time.

5. A method according to claim 1, wherein for each of the plurality of options, both the price function and the compensation function also are functions of a likelihood that the customer subsequently will purchase the resource.

6. A method according to claim 5, wherein each of the plurality of options includes a plurality of sub-options, and wherein once an option is selected the customer is presented with the sub-options that correspond to the elected option, and is allowed to select one of said sub-options.

7. A method according to claim 6, wherein for each of the plurality of said sub-options, the price and the compensation amount at least approximately maximize a consumer's expected value if the likelihood matches a true likelihood that the customer will purchase the resource.

8. A method according to claim 1, wherein the price function is identical across all of the plurality of options, and wherein the compensation function is identical across all of the plurality of options.

9. A system for establishing a pricing structure for reserving a resource, the system comprising:
   a processor;
   a memory coupled to the processor; and
   the processor is configured to select an option from among a plurality of available options with respect to delivery of a resource at a specified future time; and
   the processor is configured to present the selected option to a customer,
   wherein each of the plurality of options includes: (i) a reservation price at which the customer reserves the resource, and (ii) a compensation amount that must be paid if the resource is not delivered at the specified future time,
   wherein the specified future time comprises at least one of a point in time and an interval of time,
   wherein for each of the plurality of options, both the reservation price and the compensation amount are non-zero, and
   wherein each of the plurality of options corresponds to an estimate that the resource will be provided at the specified future time, and for each of the plurality of options, the reservation price is set in accordance with a price function and the compensation amount is set in accordance with a compensation function, and wherein both the price function and the compensation function are functions of the underlying likelihood estimate.

10. A system according to claim 9, wherein for each of the plurality of options, both the price function and the compensation function also are functions of a likelihood that the customer subsequently will purchase the resource.

11. A system according to claim 10, wherein each of the plurality of options includes a plurality of sub-options, and wherein once an option is selected the customer is presented with the sub-options that correspond to the elected option, and is allowed to select one of said sub-options.

12. A system according to claim 11, wherein for each of the plurality of said sub-options, the price and the compensation amount at least approximately maximize a consumer's expected value if the likelihood matches a true likelihood that the customer will purchase the resource.

13. A system according to claim 9, wherein the price function is identical across all of the plurality of options, and wherein the compensation function is identical across all of the plurality of options.

14. A system for establishing a pricing structure for reserving a resource, comprising:
   a processor;
   a memory coupled to the processor; and
   a facilitator including the processor and the memory,
   wherein the facilitator communicates on an as-needed basis with a plurality of customers and a plurality of resource providers,
   wherein the facilitator is configured to
   (a) select an option from among a plurality of the available options with respect to delivery of a resource at a specified future time,
   (b) present the selected option to a customer, and
   (c) obtain the resource from at least one of the plurality of resource providers,
   wherein each of the plurality of the options includes: (i) a reservation price at which the customer reserves the resource, and (ii) a compensation amount that must be paid if the resource is not delivered at the specified future time, wherein the specified future time comprises at least one of a point in time and an interval of time, wherein for each of the plurality of options, both the reservation price and the compensation amount are non-zero, and wherein each of the plurality of options corresponds to an estimate that the resource will be provided at the specified future time, and for each of the plurality of options, the reservation price is set in accordance with a price function and the compensation amount is set in accordance with a compensation function, and wherein both the price function and the compensation function are functions of the estimate.

15. A system according to claim 14, wherein at least one of the plurality of resource providers offers reservation contracts which the facilitator may use to reserve the resource.

16. A system according to claim 14, wherein estimate is estimated as an expected likelihood of obtaining the resource from any one of the plurality of resource providers.

* * * * *

UNITED STATES PATENT AND TRADEMARK OFFICE
CERTIFICATE OF CORRECTION

PATENT NO. : 7,711,657 B1  Page 1 of 1
APPLICATION NO. : 11/476305
DATED : May 4, 2010
INVENTOR(S) : Bernardo Huberman et al.

It is certified that error appears in the above-identified patent and that said Letters Patent is hereby corrected as shown below:

In column 20, line 28, in Claim 9, after "the" delete "underlying likelihood".

In column 22, line 7, in Claim 16, after "wherein" insert -- the --.

Signed and Sealed this

Thirtieth Day of November, 2010

David J. Kappos
*Director of the United States Patent and Trademark Office*